United States Patent
Kim et al.

(10) Patent No.: US 12,360,979 B2
(45) Date of Patent: Jul. 15, 2025

(54) SYSTEM AND METHOD FOR ACCESSING LEDGER INFORMATION BY USING COMMON KEYSET INFORMATION

(71) Applicants: LSWARE INC., Seoul (KR); PPUZZL GROUP INC., Seoul (KR)

(72) Inventors: Min Soo Kim, Seongnam-si (KR); Dong Myung Shin, Seoul (KR); Yong Joon Joe, Seoul (KR); Sung Il Jang, Seongnam-si (KR)

(73) Assignees: LSWARE INC., Seoul (KR); PPUZZL GROUP INC., Seoul (KR)

( * ) Notice: Subject to any disclaimer, the term of this patent is extended or adjusted under 35 U.S.C. 154(b) by 0 days.

(21) Appl. No.: 18/724,095

(22) PCT Filed: Nov. 17, 2022

(86) PCT No.: PCT/KR2022/018168
§ 371 (c)(1),
(2) Date: Jun. 25, 2024

(87) PCT Pub. No.: WO2023/128273
PCT Pub. Date: Jul. 6, 2023

(65) Prior Publication Data
US 2025/0061103 A1    Feb. 20, 2025

(30) Foreign Application Priority Data

Dec. 27, 2021    (KR) .......................... 10-2021-0188043

(51) Int. Cl.
G06F 16/22    (2019.01)
(52) U.S. Cl.
CPC ................................ *G06F 16/2282* (2019.01)
(58) Field of Classification Search
CPC .................................................. G06F 16/2282
See application file for complete search history.

(56) References Cited

U.S. PATENT DOCUMENTS

2020/0394648 A1 * 12/2020 Blackshear ............. H04L 63/12
2020/0410460 A1    12/2020 Nissan et al. ........ G06Q 20/065

FOREIGN PATENT DOCUMENTS

| KR | 10-2015-0002283 A | 1/2015 |
| KR | 10-2018-0115778 A | 10/2018 |
| KR | 10-2020-0120863 A | 10/2020 |

OTHER PUBLICATIONS

Korean Office Action mailed Jul. 3, 2024, issued to Korean Application No. 10-2021-0188043.

* cited by examiner

*Primary Examiner* — Van H Oberly
(74) *Attorney, Agent, or Firm* — Stein IP LLC

(57) ABSTRACT

A system for accessing ledger information by using common keyset information according to the present invention comprises: a transaction packer for adding key information corresponding to a transaction request to a generated transaction proposal; a transaction aggregator for generating common transaction batch information and common keyset information corresponding to the transaction proposal according to the key information included in the transaction proposal received from the transaction packer, and transmitting the common transaction batch information and the common keyset information to each execution node group distinguished and predesignated with regard to the common transaction batch information; at least one transaction executor for executing a simulation regarding the transaction proposals included in the common transaction batch information transmitted from the transaction aggregator, which belongs to the execution node group, and transferring the common keyset information; and a ledger manager for receiving the common keyset information from the transaction executor, retrieving key value information corresponding to the common keyset information from blockchain ledger information and transferring same to the transaction executor.

12 Claims, 15 Drawing Sheets

SYSTEM AND METHOD FOR ACCESSING LEDGER INFORMATION BY USING COMMON KEYSET INFORMATION

CROSS-REFERENCE TO RELATED APPLICATIONS

This application is a national stage of International Application No. PCT/KR2022/018168, filed Nov. 17, 2022, which claims the benefit of Korean Application No. 10-2021-0188043, filed Dec. 27, 2021, in the Korean Intellectual Property Office, the disclosures of which are incorporated herein by reference.

TECHNICAL FIELD

The present invention relates to blockchain distributed processing technology that allows for retrieving ledger information using common keyset information corresponding to transaction requests for efficient distributed transaction processing in a blockchain framework.

BACKGROUND ART

One of the significant issues in parallel computing is the conflict caused by reference and modification of a single variable. The most common method is the lock strategy for exclusive access control to a single variable, but since 1993, lock-free strategies such as software transactional memory (STM) and read-log-update (RLU) have been developed. STM, a representative lock-free strategy, is a parallel processing completed within a single machine, such as shared memory multi-processor (SMP), memory sharing models on distributed computing such as etcd, and conflict detection among distributed transactions in blockchain.

Blockchain technology has been anticipated to have a significant impact if applied to existing industries due to its unique characteristic of decentralizing management entities. However, the application of blockchain technology to existing industries has been slower than expected, primarily due to its very low throughput. Regarding these blockchain performance issues, efforts have been made to improve overall throughput of the platform by reducing consensus time, increasing block processing capacity, and distributing transactions across chains using technologies such as consensus algorithms and multi-chain approaches.

Typically, mining involves four tasks: 1. selecting transactions to execute, 2. executing transactions, 3. determining transaction records, and 4. finding the hash and nonce.

Consensus algorithm development generally focuses on optimizing and speeding up the third and fourth stages and the verification process. Early blockchain frameworks followed Bitcoin's proof of work (PoW) consensus method for public blockchains, leading to the development of safe and efficient consensus algorithms to improve speed at the third and fourth stages. However, research on traditional consensus algorithms did not target speedup of the second stage of transaction execution. In addition to improving consensus algorithms, there is a multi-chain (multi-channel, side chain) approach that enhances overall throughput by handling different areas or types of transaction requests for each chain. Although processing and generating blocks separately for each chain can improve throughput, performance degradation may occur due to within-block key conflict issues when different chains reference and modify the same key for shared information or variables necessary for interaction between chains. This means that if processes required by traditional industries, such as inventory management, are implemented directly on blockchain, it is difficult to process them efficiently.

Blockchain is composed of distributed nodes for mutual verification, but it has a chronic problem of being unable to improve scalability with an increase in the number of nodes. One of the most representative reasons for the difficulty in achieving scalability in blockchain is the within-block key conflict issue.

The within-block key conflict issue arises when transactions executed by two or more computational entities (transaction request executors) reference and modify the same key, and this key conflict between transactions prevents them from being processed simultaneously within a single block. This is because if values modified by transactions after referencing the same key differ (if the R/W set conflicts), the consistency of the ledger records is broken. This process corresponds to the R/W set validation in software transactional memory (STM). Similarly, in blockchain, if the R/W set conflicts when reflecting transactions as in STM, the transaction processing results must be discarded, re-executed, and attempted to be reflected in the next block. Consequently, to confirm interfering transactions, as many blocks as the number of interfering transactions are required.

If modified values can be mutually shared, these issues can be resolved, but since blockchain is composed of distributed nodes, it requires a distributed shared memory model instead of shared memory. However, this implies greater performance degradation, making it undesirable to share processing results between different nodes.

As a result, the within-block key conflict issue not only indicates performance degradation in blockchain but also causes problems such as reduced block density (decreased number of transactions contained in one block) and decreased transaction computation resource efficiency (decreased effective transaction execution rate due to repeated re-execution of the same transactions).

In other words, in the early stages of blockchain technology, a structure was adopted where transaction requests to be processed were calculated on one node, followed by verification on the remaining nodes, and thus there were no issues arising from distributing and processing transactions across nodes. However, due to hardware limitations such as I/O performance or CPU performance, there is a limit to the number of transactions that a single node can process per block generation cycle. This means that as the number of transactions requested per unit time increases, given transactions cannot be processed by a single node and must be distributed and processed across multiple nodes. To this end, distributed processing transactions among nodes on the blockchain has become important.

To solve this problem, various technologies have been proposed. These technologies range from solutions for partial and specific cases, such as Raiden/Lightning Network, to more macro approaches such as Sharding and Multi-chain. However, since these technologies are directly or indirectly based on transaction processing and error recovery functions using the STM method, single block key conflict issues inevitably arise.

In a transactional system, if the end points of concurrently executed transactions (Tx), i.e., the cycles reflecting the results, do not nearly coincide and the probability of R/W set conflict occurring between transactions is low, the parallel processing performance of the STM method is higher than the lock strategy. However, in blockchain, the reflection of the execution results of transactions (Tx) only occurs at the time of block generation. If only one transaction is executed per block, there may be no issue, but in the case of parallel processing or even distributed processing, since the points in time of reflecting the execution results of all transactions (Tx) always coincide, all R/W set conflicts between the transactions (Tx) occur simultaneously. As a result, the probability of STM retry occurrence inevitably increases compared to a typical SMP environment, leading to very low parallel processing performance of the blockchain system. Therefore, applying the STM method directly to blockchain is inappropriate for the reasons explained above, and a method to solve this problem is necessary.

Additionally, when executing a smart contract, necessary values are read from the blockchain ledger each time they are needed. In this case, if these values can be read in advance from the blockchain ledger and stored in RAM, the transaction execution speed can be improved. However, it has been difficult to predict which values will be needed beforehand. Moreover, because the blockchain ledger has a sequential structure, it is difficult to know where the required values are recorded. Therefore, each time a value is needed, the blockchain ledger must be accessed to retrieve each value, leading to a considerable amount of time required when executing a smart contract. Related Art: Korean Laid-open Patent Publication No. 10-2018-0115778

DETAILED DESCRIPTION OF THE INVENTION

Technical Problem

An object of the present invention relates to a system and method for accessing ledger information using common keyset information, which allows for retrieving ledger information of blockchain at high speed using common keyset information for efficient transaction processing in blockchain.

Technical Solution

According to the present invention to achieve the above object, a system for accessing ledger information by using common keyset information includes: a transaction packer configured to generate a transaction (Tx) proposal indicating transaction information according to a user's transaction request and add key information corresponding to the transaction request to the generated transaction proposal; a transaction aggregator configured to generate common transaction batch information and common keyset information corresponding to the transaction proposal according to the key information included in the transaction proposal received from the transaction packer, and transmit the common transaction batch information and the common keyset information to each execution node group distinguished and predesignated with regard to the common transaction batch information; at least one transaction executor configured to execute a simulation regarding the transaction proposals included in the common transaction batch information transmitted from the transaction aggregator, which belongs to the execution node group, and transfer the common keyset information; and a ledger manager configured to receive the common keyset information from the transaction executor, retrieve key value information corresponding to the common keyset information from blockchain ledger information and transfer same to the transaction executor.

The key information may include partial key information in an indetermined form including an array or composite key.

The common keyset information may represent a set of keys that are identical among pieces of key information included in a plurality of transaction proposals.

The common transaction batch information may represent a set of transaction proposals respectively corresponding to pieces of key information included in the common keyset information.

The ledger manager may retrieve key value information corresponding to all key information included in the common keyset information from the ledger information at once when retrieving key value information corresponding to the common keyset information from the ledger information.

The transaction executor may store state information resulting from executing the simulation of the transaction proposals in a cache memory and use the stored state information as a value for a simulation regarding the next transaction proposal.

For the simulation of the transaction proposal, the transaction executor may first access the cache memory to reference the state information, and when the state information for the simulation of the transaction proposal does not exist in the cache memory, the transaction executor may transfer the common keyset information to the ledger manager, receive key value information corresponding to the common keyset information from the ledger manager and store same in the cache memory.

According to the present invention to achieve the above object, a method of accessing ledger information by using common keyset information may include the steps of: generating, at a transaction packer, a transaction (Tx) proposal indicating transaction information according to a user's transaction request and adding key information corresponding to the transaction request to the generated transaction proposal; generating, at a transaction aggregator, common transaction batch information and common keyset information corresponding to the transaction proposal according to the key information included in the transaction proposal received and transmitting the common transaction batch information and the common keyset information to each execution node group distinguished and predesignated with regard to the common transaction batch information; transferring, at at least one transaction executor, the common keyset information to a ledge manager; receiving, at the ledge manager, the common keyset information from the transaction executor, retrieving key value information corresponding to the common keyset information from blockchain ledger information, and transferring same to the transaction executor; and executing a simulation regarding the transaction proposals by using the received key value information.

The retrieving of the key value information corresponding to the common keyset information from the ledger information may include retrieving key value information corresponding to all key information included in the common keyset information from the ledger information at once.

The executing of the simulation regarding the transaction proposals may include storing state information resulting from the simulation of the transaction proposals in a cache memory and using the stored state information as a value for simulation of the next transaction proposal.

The executing of the simulation regarding the transaction proposals may include accessing the cache memory to reference the state information for the simulation of the transaction proposal, and when the state information for the simulation of the transaction proposal does not exist in the cache memory, transferring the common keyset information to the ledge manager, receiving key value information corresponding to the common keyset information from the ledge manager, and storing same in the cache memory.

Advantageous Effects

According to the present invention, for multiple transaction requests, high transaction execution efficiency can be achieved by classifying and executing them based on common keyset information to prevent mutual interference among the execution nodes that are to process the transaction requests, unlike the existing multi-chain blockchain technology and transaction pre-ordering technology.

In addition, when a transaction executor executes a simulation based on common transaction batch information, information stored in cache memory is primarily used, and only if it is not stored in the cache memory, blockchain is referenced to execute the simulation of a transaction proposal, significantly improving the simulation execution speed of the transaction proposal.

Accordingly, it is possible to generate a transaction group for each node group that ensures execution results without a within-block key conflict at a sufficiently fast speed. By dividing and distributing common transaction batch information to node groups on the blockchain and processing them sequentially or concurrently, a blockchain framework technology that achieves scalability with an increase in the number of nodes can be implemented.

In particular, according to the present invention, by transferring the common keyset information from the transaction executor to the ledger manager and allowing the ledger manager to retrieve key values for the transactions from the ledger information at once using the common keyset information, the time required to retrieve the ledger information during the execution of a smart contract can be significantly reduced.

BRIEF DESCRIPTION OF DRAWINGS

FIG. 2 illustrates transactions according to user's requests.

MODE FOR INVENTION

Figure 1:
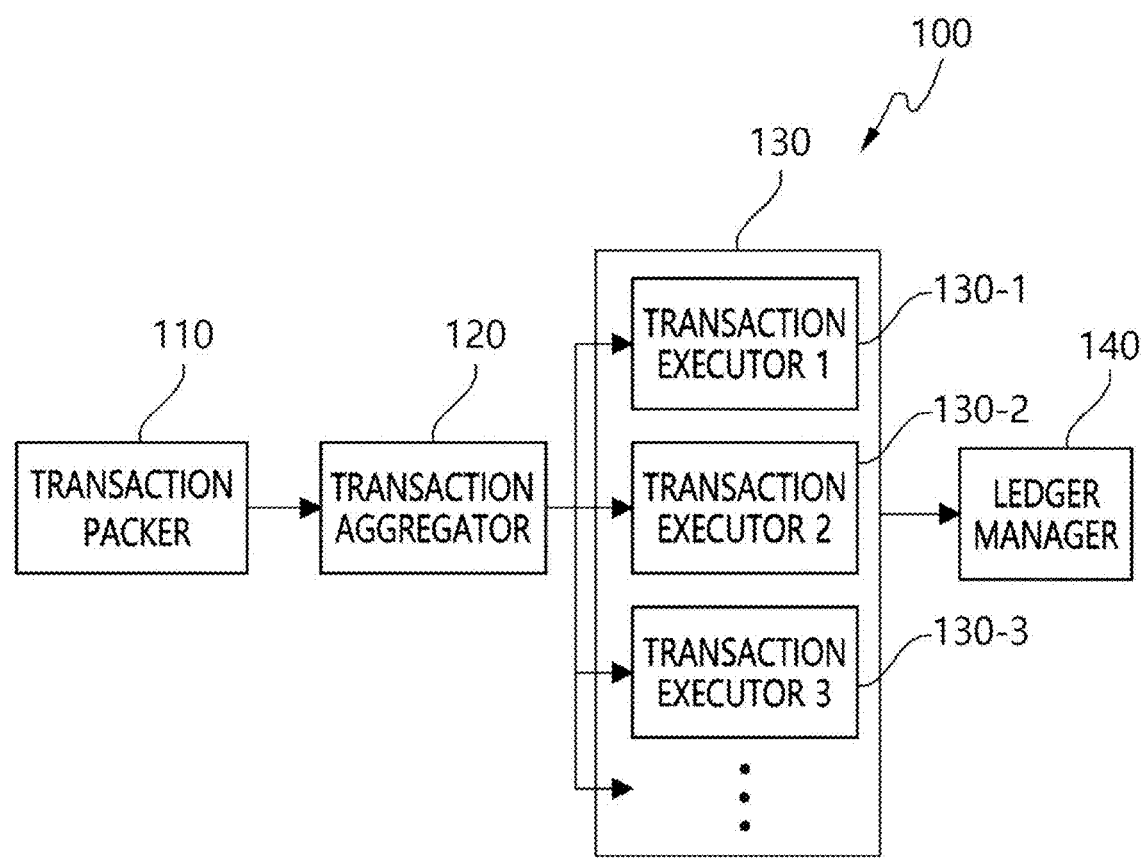
FIG. 1 is a block diagram of an embodiment of a system for accessing ledger information using common keyset information according to the present invention.

Hereinafter, preferred embodiments of the present invention will be described in detail with reference to the accompanying drawings.

The embodiments of the present invention are provided to more fully describe the present invention to those of ordinary skill in the art, the following embodiments may be embodied in many different forms, and the scope of the present invention is not limited to the following embodiments. Rather, these embodiments are provided so that this disclosure will be more thorough and complete, and will fully convey the concept of the invention to those of ordinary skill in the art.

The terminology used herein is for the purpose of describing particular embodiments only and is not intended to be limiting of the present invention. As used herein, the singular forms "a," "an" and "the" are intended to include the plural forms as well, unless the context clearly indicates otherwise. As used herein, the term "and/or" includes any and all combinations of one or more of the associated listed items.

The technology proposed by the present invention applies transaction parallel processing technology to a blockchain framework, aiming to improve the parallel processing efficiency of blockchain by dividing transaction requests to prevent within-block key conflict issues among transactions processed by different nodes.

This method mainly consists of generating key information according to transaction requests, classifying transactions with common keyset information based on the generated key information (transaction proposal aggregation: TPA), and executing calculations for the classified transactions using a cached transaction (Tx) executor. The TPA classifies real-time transaction requests by node groups to avoid key duplication among the groups, while the cached Tx executor executes the classified and allocated transactions in order.

First, detailed explanations of terms and data structures related to the present invention are as follows:

Tx: abbreviation for transaction. Tx refers to one process and consists of information necessary for transaction processing required by the applicable blockchain architecture.

Tx proposal: contains transaction information according to a transaction request.

Tx simulation: refers to the execution result in a transaction executor for a transaction request.

Ledger key: refers to a key (variable name) of a value recorded in the ledger. It does not refer to variables or field names within a structure that are not recorded in the ledger.

Partial ledger key: information consisting of a part of the key of the value recorded in the ledger.

R/W key set (RWKS): a set of ledger key information referenced and modified during the execution of an arbitrary Tx proposal.

eTP (encapsulated Tx proposal): a Tx proposal with R/W key set description information added to the existing Tx proposal for delivery to the transaction aggregator.

Tx tree itself is a representation that represents a classification of one type of Tx and is also a data structure that represents a set of classified Txs.

Tx tree largely consists of two types of data. One is the RWKS of the Tx tree, which represents the criteria for classifying the type of the Tx Tree. The other is the Tx set, which is a set of Txs that meet the classification criteria of the Tx tree.

eTPB: a bundle of eTPs with defined order and mutual influence. The order within an eTPB is defined by eTPID (TxID).

eTPBs (Forest, ForestContainer): a bundle of ordered eTPBs. The order of eTPBs within an eTPB is defined by eTPBID (TreeID).

eTSBs: a bundle of Tx simulations executed by the transaction executor in the order defined by eTPBs.

eTPRBs: a bundle of Tx proposal responses executed in the order defined by eTPBs.

NodeInfoMap: refers to the status information of all nodes participating in the blockchain.

Capacity: refers to the Tx processing capacity that each node group can handle within one block generation cycle.

Arithmetic Load: refers to the time taken for Tx execution that does not include key reference and modification operations on the ledger.

Key load: refers to the execution time required to reference and modify a key on the ledger.

eTP consists of the following information.

TABLE 1

| Type | Description |
| --- | --- |
| EtpId (string) | identifier of eTP Generally, it follows TX ID of Tx proposal |
| TaskLoad (int32) | The cost (≒ time) required to execute the Tx proposal, excluding the time taken to read or write values from the ledger. |
| ParKeys ([ ]string, or [ ]([ ]string)) | An array of partial ledger keys of the ledger key that the Tx proposal may reference or modify. |
| Keys ([ ]string) | An array of ledger keys that the Tx proposal may reference or modify. |
| Proposal (varies depending on the applied blockchain platform) | Raw data of the Tx proposal of the applied blockchain platform (Tx proposal can be directly inserted) |
| Receptor (string) | Information of the node (API Server) that has received the Tx proposal. Not covered by this document. | eTPB consists of the following information:

TABLE 2

| Type | Description |
| --- | --- |
| TreeId (string) | Identifier of a tree |
| TreeCoreLoad (int32) | The sum of TaskLoads of the Tx proposals contained in the tree |
| ParKeys (map[string]bool, or map[[ ]string]bool) | An array of partial ledger keys that all Tx proposals contained in the tree may reference or modify |
| Keys (map[string]bool) | An array of ledger keys that all Tx proposals contained in the tree may reference or modify |
| Etps ([ ]ETP) | An array of Tx proposals contained in the tree. | eTPBs consist of the following information:

TABLE 3

| Type | Description |
| --- | --- |
| Forest ([ ]eTPB) | A set of all eTP Trees processed by a target node group for transmission. The order of data loading for eTP Trees is not guaranteed, so the order is determined by the TreeID of the eTP tree. |
| ForestID (NodeGroupID: int31) | A target node group ID for the transmission of the eTPB. |
| ForestLoad (int32) | Load value when executing all the eTPBs. |

Communication Protocol Between dTPAs (Distributed TPAs)

dTPA is a TPA machine distributed on the network. dTPA exclusively or simultaneously receives eTP information from each API server. Each dTPA classifies eTPs using the same algorithm, but due to the order and method in which multiple eTP information are received, it is not possible to classify eTPs in the same way across all TPAs. To solve this problem, dTPAs must share information with each other, either selectively or non-selectively, so that all TPAs can classify eTPs in the same manner and transmit the classification results to each endorsing peer node without duplication.

For this purpose, dTPAs exchange the following information with each other.

TABLE 4

| Type | Communication method | Description |
| --- | --- | --- |
| eTP_Charge | Broadcast | A signal indicating that an arbitrary eTP will be handled by a specific TPA. It consists of eTP and TPA_Id. |
| Charge_Negotiate | P2P | Communication to resolve duplicate declaration of responsibility for an arbitrary eTP by a TPA. The data structure may vary according to the negotiation algorithm. |
| eTPBs_Broadcast | Broadcast | A signal to inform other TPAs of the eTPBs that the TPA is currently handling at the time of transmission. eTPBs or ΔeTPBs information is shared. |
| RWKS_Broadcast | Broadcast | A signal to inform other TPAs of RWKS of the eTPBs that the TPA is currently handling at the time of transmission. |

TABLE 4-continued

| Type | Communication method | Description |
|---|---|---|
| eTP_Toss | P2P | eTPBs or ΔeTPBs information is shared. Communication to pass an eTP that the TPA cannot handle to a target TPA. |
| eTPB_Exchange_Negotiation | P2P | A negotiation signal to mutually exchange eTPBs between TPAs. |
| eTPB_Exchange | P2P | A negotiation signal to mutually exchange eTPBs between TPAs. |

In a case where the declaration of responsibility for a specific eTP is duplicated, TPAs that have performed charge negotiation do not need to forward the decision results to other TPAs. This is because a TPA that has not declared responsibility for the eTP does not classify the eTP and only needs to receive the classification results through the eTPB_Broadcast. If a TPA has not yet received the classification results and receives an eTP with variable overlap with the relevant eTP, the TPA is only required to transfer the eTP to all TPAs that have declared responsibility for it through eTP_Toss. The data structure of the dTPA is as follows.

TABLE 5

| Type | Description |
|---|---|
| eTP_Charge | eTP(ETP), TPA_Id(int32) |
| Charge_Negotiate | E.g.: TPA_Id(int32), related_tx_count(int32), released_forest_count(int32) |
| eTPBs_Broadcast | all eTPBs or eTP included in ΔeTPBs, which is the history of changed eTPBs |
| RWKS_Broadcast | all eTPBs, or Ledger key RWKS and partial key RWKS of the eTPBs included in ΔeTPBs, which is the history of changed eTPBs |
| eTP_Toss | all eTPs |
| eTPB_Exchange_Negotiation | E.g.) eTPB_IDs([ ]int32), eTPB_IDs([ ]int32), bool(ID of eTPB to give, ID of eTPB to receive, acceptance status) |
| eTPB_Exchange | [ ]eTPB |

The details of a transaction executor with a cache, capable of distributed processing, are as follows. The present invention proposes a transaction executor structure that efficiently executes Tx batch information planned and classified for distributed computing through TPA. Simultaneously, the present invention presents a transaction executor structure that improves execution speed by effectively reducing I/O delays occurring during the process of referencing values from the ledger.

First, the terms for the present disclosure are defined as follows.

Block generation cycle: refers to the time required to execute all transactions included in a single block.

Global cache: refers to a cache memory that stores values referenced and modified by all transaction proposals executed within a single block generation cycle.

Read entry: information on the key and value retrieved by the transaction proposal, which is the type of information stored in the read set. It includes a key, a value, and a reference location of the value (the block number of the value and the Tx number within that block).

Write entry: information on the key and value recorded and modified by a Tx, which is the type of information stored in the write set. It includes a key, a value, and information on whether the value is deleted.

The transaction executor proposed by the present invention has the following characteristics.

Global cache is valid within one block generation cycle. Local cached R/W set is valid during the execution of a single transaction proposal. When a transaction proposal references a value, it does so in the order of local cached R/W set→global cache→ledger. When a transaction proposal records and modifies a value, it records the value only in the local cached R/W set and does not reflect it in the global cache. Only when the execution of the transaction proposal is completed successfully, the records and modifications of that transaction proposal (i.e., local cached R/W set) are reflected in the global cache. The transaction proposals are executed sequentially in the order specified in a batch, and the results (R/W set) are also recorded sequentially.

The transaction executor has mainly two new data structures.

Global cache is a cache that temporarily stores the read/write values of all transactions executed within one block generation cycle.

Local cached R/W set is a cache that temporarily stores the read/write values during the execution of a single Tx.

The global cache and local cached R/W set store read entries in the read set and write entries in the write set, based on the key.

The read entries of the global cache and local cached R/W set consist of the following information.

TABLE 6

| Type | Description |
|---|---|
| Key (string) | Key of a value in the ledger. The type may vary depending on the blockchain structure. |
| Value (string) | A value in the ledger. The type may vary depending on the blockchain structure. |
| Version (int, int) | The position in the ledger where the value was recorded. The first value is the block number, and the second value is the Tx number within that block. Depending on the discussion, it may only have the block number. |

The write entries of the global cache and the local cached R/W set consist of the following information.

TABLE 7

| Type | Description |
|---|---|
| Key (string) | Key of a value in the ledger. The type may vary depending on the blockchain structure. |
| Value (string) | A value in the ledger. The type may vary depending on the blockchain structure. |
| IS_deleted(bool) | Indicating whether the value is deleted. It indicates whether there was a deletion of the value during the relevant transaction (local cached R/W set) or the block generation cycle (global cache). |

The transaction executor executes transactions in units of a Tx batch rather than individually and returns the results.

1. The transaction executor receives $batch_P$, which is a batch of transaction requests.

2. The transaction executor creates $batch_Q$, which is a batch of the empty transaction execution results.

3. The transaction executor creates $Cache_G$, which is an empty global cache.

4. When the block creation cycle begins, the transaction executor executes the received batch.

5. If there are no remaining $TxProp_A$ in the batch, the transaction executor proceeds to the next step.

6. The transaction executor creates $Cache_L$, which is a local cached R/W set for the empty $TxProp_A$.

7. The transaction executor executes $TxProp_A$.

8. If $TxProp_A$ is executed successfully, the transaction executor overwrites the write set of the local cached R/W set of $TxProp_A$ to the write Set of the global cache.

9. The transaction executor adds $TxProp_A$ and $Cache_L$ to $batch_Q$.

10. When all transaction requests in the batch have been executed, the transaction executor transmits $batch_Q$ as the execution result to a committing node.

$Cache_G$, which is the global cache, and $Cache_L$, which is the local cached R/W set, are modified under the following circumstances.

A. When referencing the value of key X while executing an arbitrary Tx:

First, key X is referenced in the local cached R/W set ($Cache_L$), and if a value exists, the corresponding value is returned.

When a value is not in $Cache_L$, the global cache ($Cache_G$) is referenced, a corresponding value is returned if it exists, and the read entry is added to $Cache_L$.

If the value is not in $Cache_G$ either, the ledger is referenced, a corresponding value is returned, and the read entry is added to both $Cache_G$ and $Cache_L$.

B. When adding, modifying, or deleting the value of key X while executing an arbitrary Tx, these changes are reflected only to the local cached R/W set ($Cache_L$).

C. When the execution of the arbitrary Tx is successfully completed (4.4 of the above algorithm), i.e., when the Tx reflects the added, modified, or deleted value, the content of the write set in $Cache_L$ is reflected to the global cache (Cache( ).

By executing in this manner, it is possible to generate a block without within-block key conflict issues, even when executing Tx that references and modifies the value of a key multiple times within one block generation cycle.

Prefetching by Read/Write Key Set

By adopting the global cache and local cached R/W set structure proposed above, the within-block key conflict issue can be resolved. In addition, execution performance can be improved by reducing I/O delay using the RWKS information provided by the Tx proposal batch.

RWKS encompasses the keys of all values referenced or modified when executing all Tx in the Tx proposal batch that includes the RWKS.

In other words, if all keys contained in the read key set of the RWKS are preloaded into the global cache, the I/O delay that occurs while waiting for references generated during Tx execution to be read from the ledger can be effectively eliminated.

Prefetching can be efficiently implemented by running it as a thread independent of the existing Tx execution thread.

Since the order of the required read keys can also be known in advance, prefetching can be done in that order, but the reference order is not always consistent due to branches such as if-then-else. To solve this, a method using a prioritized queue may be introduced.

The structure of the executor introduced in the present invention is explained on the premise that all Tx are sequentially processed. However, parallel processing is also possible with this executor. For example, parallel processing can be done on a tree-by-tree basis or according to the order determined by a Tx dependency graph.

The Tx batch received by the transaction executor is a Tx forest, that is, a set of Tx trees that are mutually independent in terms of keys. Thus, it is easy to create executor threads for each Tx tree and execute them in parallel. At this time, since the I/O load is a resource shared by all threads (Tx trees), the method of calculating the key load of the Tx batch for each node of the TPA is almost the same.

However, the method of calculating the Tx execution load of the Tx batch may vary. If memory I/O resource contention can be ignored, the Tx execution load should be calculated as the maximum value, not the sum of the Tx Execution Load of all Tx trees in the Tx batch.

Hereinafter, the system and method for accessing ledger information using common keyset information according to the present invention will be described in detail.

FIG. 1 is a block diagram illustrating an embodiment of a system for accessing ledger information using common keyset information (hereinafter, referred to as a "ledger information access system") according to the present invention.

Referring to FIG. 1, the ledger information access system 100 includes a transaction packer 110, a transaction aggregator 120, an execution node group 130, and a ledger manager 140.

The transaction packer 110 generates a transaction proposal (Tx proposal) representing transaction information according to the user's transaction request (IN), and adds key information corresponding to the transaction request to the generated transaction proposal, then transfers it to the transaction aggregator 120.

The transaction proposal includes transaction information corresponding to the user's transaction request and represents the data format of a transaction that can be used by the transaction aggregator 120.

The key information refers to the ledger key as defined in the terminology above. Additionally, the key information may include partial key information in an indetermined form including an array or composite key. This refers to the partial ledger key as defined in the terminology above.

The ledger key referenced and modified in various cases may be determined at the time of executing the Tx, or it may be difficult to fully identify before executing the Tx. The partial ledger key is used in the following situations.

It is used when subsets of the ledger key referenced and modified in the Tx share specific characteristics. Examples include cases where all or some of the values of an array (e.g., array abc) are accessed, where the head character string is the same, where a trailing character string is the same, or where a specific character string is included. Additionally, it applies when the ledger key referenced and modified in the Tx is generated or acquired during execution, and its characteristics are known in advance.

An array may be treated in the same way as in the case of the same head character string, the trailing character string may also be used similarly by reversing the character string, and partial string matching methods may also be used by appropriately modifying the data structure and algorithm. However, when adding trailing character string matches and partial character string matches, it only needs to add an additional dictionary layer. For the purpose of explanation, the case where the head character string is the same will be described.

An R/W key set (RWKS) is prepared not only for the ledger key but also for both partial ledger key and ledger key. For example, a trie may be used as the data structure for a dictionary that stores partial ledger keys and ledger keys. If it is known that a Tx of a particular smart contract mainly accesses character strings starting with "APPLE" such as "APPLESEEED" and "APPLEJUICE," then the partial key of this Tx is represented as "APPLE*".

In this way, when a partial ledger key is given, with all partial ledger keys K in RWKS of the partial ledger key of a new Tx A, K is searched in the RWKS for partial ledger keys of all Tx Trees BI to Bk. The same algorithm is applied to the partial ledger key K and the RWKS of partial ledger key.

If partial ledger key K is not found, the above algorithm can be executed as is to classify a Tx that includes the partial ledger key through the above algorithm.

Meanwhile, there is a Tx that is difficult to classify even with the above partial key Tx aggregation. This occurs when the ledger key referenced and modified in the Tx is generated or acquired during execution and its characteristics cannot be known in advance. Examples include cases where a ledger key is determined randomly or where the value on the ledger is used as the ledger key. In such cases, Txs containing an uncertain key are classified into a single Tx tree, and if the size of the classified uncertain key Tx tree is large, only an appropriate size is adopted and the rest are held in reserve. The uncertain key Tx tree is added to all eTPBs classified by the above algorithm.

When this uncertain key Tx tree is first executed in the transaction executor and then the remaining Tx trees are executed based on the execution results (cache), it becomes possible to parallel process even those Txs that could not be classified due to uncertain keys without R/W Set conflicts between the Tx trees. For example, when a value given as an argument to the smart contract is used as the head character string, the value "XYZ" is utilized to create a string like "XYZ*", Here, character '*' is considered as a special character rather than a regular character.

The transaction packer 110 converts the user's transaction request into a Tx proposal, adds additional information to generate an eTP, and transfers the generated eTP to the transaction aggregator 120. Here, the eTP is a Tx proposal with additional information (R/W key set description information) added to the existing Tx Proposal for delivery to the transaction aggregator 120.

FIG. 2 illustrates transactions Tx 1 to Tx 11 according to user's requests. Referring to FIGS. 2, A, B, C, D, E, F, G, and H in transactions Tx 1 to Tx 11 may represent senders and receivers in monetary transactions. For example, Tx 1: A→C may illustrate a transaction where person A sends a certain amount of money to person C.

The transaction packer 110 generates transaction proposals corresponding to transactions Tx 1 to Tx 11 according to users' requests. Here, the transaction proposal is the data format of a transaction, including the sender and receiver, the direction of remittance, the amount of money, and the like corresponding to the requested transactions Tx 1 to Tx 11. FIG. 2 illustrates A→C, A→D, A→E, B→F, B→G, B→H, A→B, C→D, E→F, D→H, and G→H.

The transaction packer 110 adds key information corresponding to the transaction request to the generated transaction proposal. Here, the key information refers to the ledger key, for example, A, B, C, D, E, F, G, and H, which constitute the transactions Tx 1~Tx 11 in FIG. 2.

For example, the transaction packer 110 generates an eTP by adding corresponding key information A and C to the generated transaction proposal A→C and transfers the generated eTP to the transaction aggregator 120. Additionally, the transaction packer 110 generates an eTP by adding corresponding key information A and D to the generated transaction proposal A→D and transfers the generated eTP to the transaction aggregator 120. In this way, the transaction packer 110 sequentially generates and transfers eTPs for each transaction Tx 1 to Tx 11 to the transaction aggregator 120 for the transactions requested over a certain period of time.

The transaction aggregator 120 generates common keyset information and common transaction batch information corresponding to the transaction proposal based on the key information included in the transaction proposal (eTP) received from the transaction packer 110, and transmits (OUT) the generated information to an execution node group distinguished and predesignated with regard to the transaction batch information.

The common keyset information represents a set of keys that have the same key among the pieces of key information included in a plurality of transaction proposals. Here, the common keyset information refers to R/W Key Set (RWKS) information as defined in the terminology above.

The transaction batch information represents a set of transaction proposals respectively corresponding to pieces of key information included in the common keyset information. Here, the transaction batch information refers to the eTPB as defined in the terminology above, and the order within the eTPB is defined by eTPID (TxID).

Figure 3:
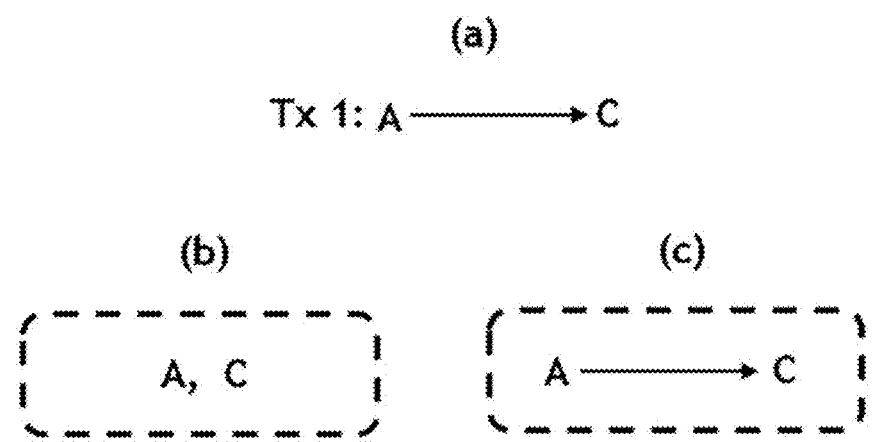
FIG. 3 is a reference diagram illustrating an example for describing a process by which a transaction aggregator generates common keyset information and common transaction batch information.

FIG. 3 is a reference diagram of an example for describing a process of generating common keyset information and common transaction batch information performed by the transaction aggregator 120.

(a) of FIG. 3 represents a transaction proposal (eTP): A→C received from the transaction packer 110. Although not shown in (a) of FIG. 3, the transaction proposal (eTP) A→C includes information of A and C that corresponds to key information.

(b) of FIG. 3 illustrates that first common keyset information A and C is generated for the transaction proposal (eTP): A→C using the key information A and C included in the transaction proposal (eTP). Additionally, (c) of FIG. 3 illustrates first common transaction batch information A→C corresponding to the common keyset information A and C. Referring to (b) and (c) of FIG. 3, it can be confirmed that the first common keyset information A and C and the first common transaction batch information A→C corresponding to the transaction proposal (eTP): A→C are each generated by the transaction aggregator 120.

Figure 4:
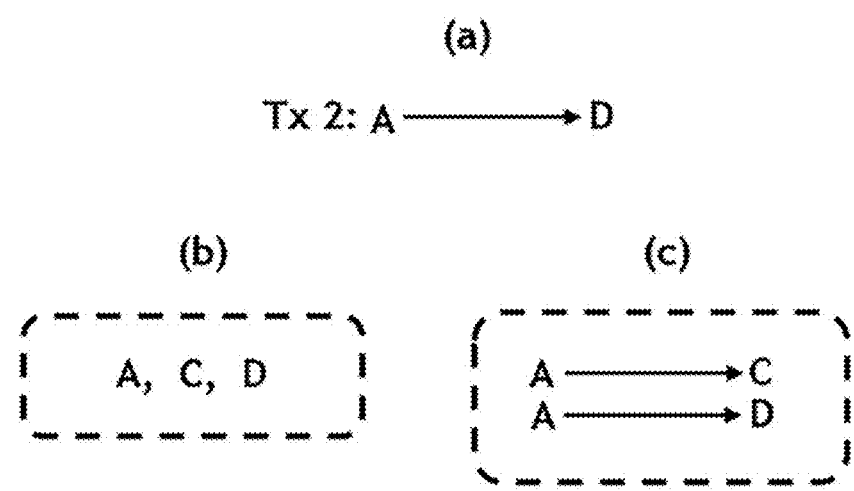
FIG. 4 is a reference diagram illustrating another example for describing a process by which the transaction aggregator generates common keyset information and common transaction batch information.

FIG. 4 is a reference diagram of another example for describing a process of generating common keyset information and common transaction batch information performed by the transaction aggregator 120.

(a) of FIG. 4 represents a transaction proposal (eTP): A→D received from the transaction packer 110. Although not shown in (a) of FIG. 4, the transaction proposal (eTP) A→D includes information of A and C that corresponds to key information.

(b) of FIG. 4 illustrates that first common keyset information A, C, and D is generated for the transaction proposal (eTP): A→D using the key information A and D included in the transaction proposal (eTP). The first common keyset information represents a set of key information common to transaction proposals (eTP): A→C and A→ID, corresponding to A, C, and D. Additionally, (c) of FIG. 4 illustrates first common transaction batch information A→C and A→D corresponding to the common keyset information A, C, and D. Referring to (b) and (c) of FIG. 4, it can be confirmed that the first common keyset information A, C, and D and the first common transaction batch information A→C and A→D corresponding to the respective transaction proposals (eTP): A→C and A→D are each generated by the transaction aggregator 120.

Figure 5:
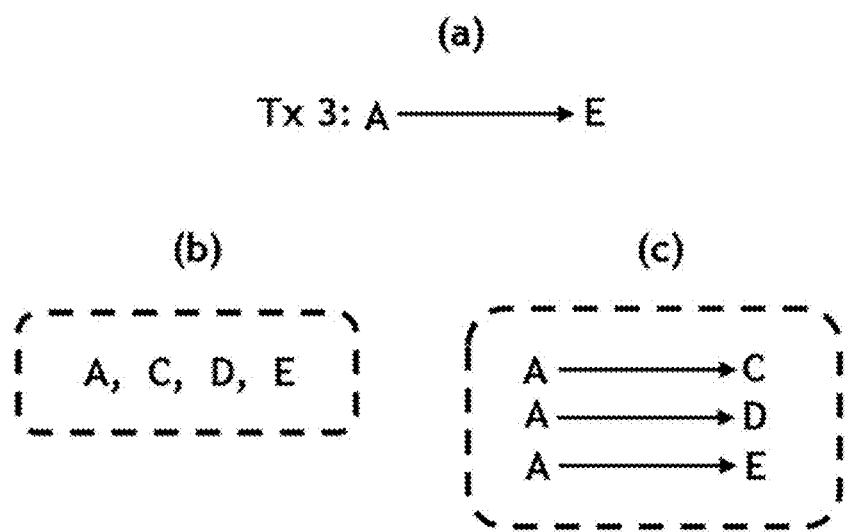
FIG. 5 is a reference diagram illustrating another example for describing a process by which the transaction aggregator generates common keyset information and common transaction batch information.

FIG. 5 is a reference diagram of another example for describing a process of generating common keyset information and common transaction batch information performed by the transaction aggregator 120.

(a) of FIG. 5 represents a transaction proposal (eTP): A→E received from the transaction packer 110. Although not shown in (a) of FIG. 5, the transaction proposal (eTP) A→E includes information of A and E that corresponds to key information.

(b) of FIG. 5 illustrates that first common keyset information A. C, D and E is generated for the transaction proposal (eTP): A→E using the key information A and E included in the transaction proposal (eTP). The first common keyset information represents a set of key information common to transaction proposals (eTP): A→C, A→D, and A→E, corresponding to A, C, D, and E. Additionally, (c) of FIG. 5 illustrates first common transaction batch information A→C, A→D, and A→E corresponding to the common keyset information A, C, D, and E. Referring to (b) and (c) of FIG. 5, it can be confirmed that the first common keyset information A, C, D, and E and the first common transaction batch information (A→C, A→D, and A→E) corresponding to the respective transaction proposals (eTP): A→C, A→D, and A→E are each generated by the transaction aggregator 120.

Figure 6:
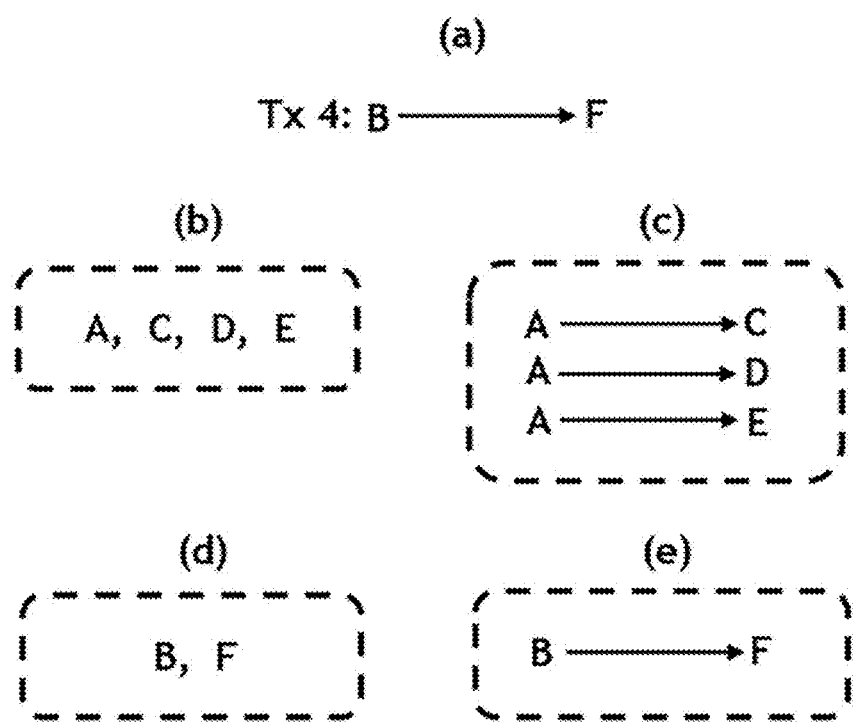
FIG. 6 is a reference diagram illustrating another example for describing a process by which the transaction aggregator generates common keyset information and common transaction batch information.

FIG. 6 is a reference diagram of another example for describing a process of generating common keyset information and common transaction batch information performed by the transaction aggregator 120.

(a) of FIG. 6 represents a transaction proposal (eTP): B→F received from the transaction packer 110. Although not shown in (a) of FIG. 6, the transaction proposal (eTP) B→F includes information of B and F that corresponds to key information.

(b) of FIG. 6 and (c) of FIG. 6 correspond to (b) of FIG. 5 and (c) of FIG. 5, respectively. Since the key information of the transaction proposal (eTP): B→F received from the transaction packer 110 corresponds to B and F, there is no change in the first common keyset information and the first common transaction batch information.

In contrast, (d) of FIG. 6 illustrates that second common keyset information B and F is newly generated for the transaction proposal (eTP): B→F using the key information B and F included in the transaction proposal (eTP).

Additionally, (e) of FIG. 6 illustrates that second common transaction batch information B→F corresponding to the second common keyset information B and F. Referring to (d) and (e) of FIG. 6, it can be confirmed that the second common keyset information B and F and the second common transaction batch information B→F corresponding to the transaction proposal (eTP): B→F are each generated by the transaction aggregator 120.

Figure 7:
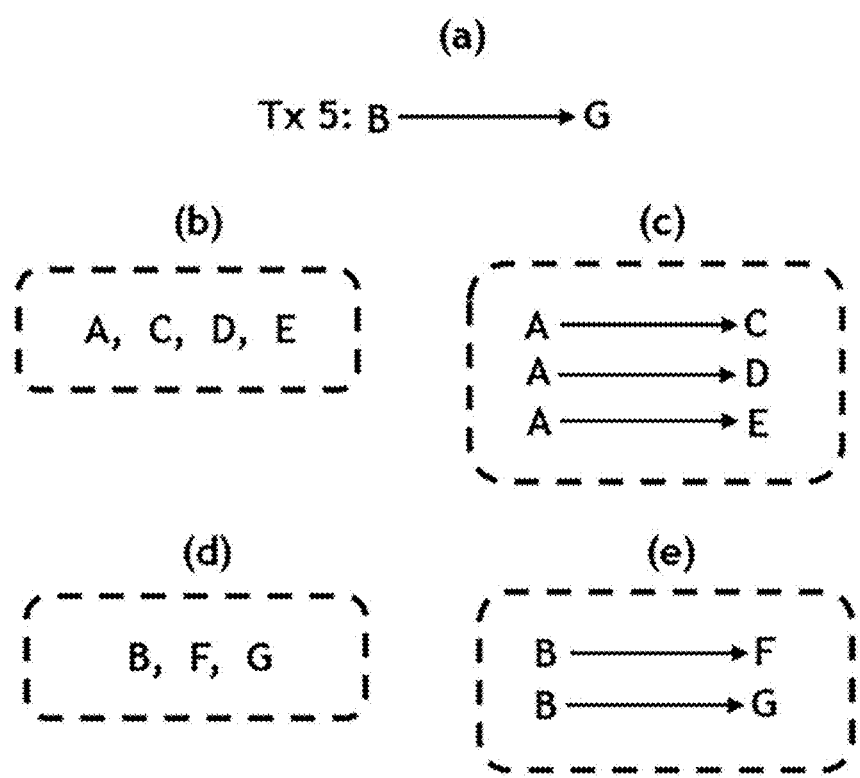
FIG. 7 is a reference diagram illustrating another example for describing a process by which the transaction aggregator generates common keyset information and common transaction batch information.

FIG. 7 is a reference diagram of another example for describing a process of generating common keyset information and common transaction batch information performed by the transaction aggregator 120.

(a) of FIG. 7 represents a transaction proposal (eTP): B→G received from the transaction packer 110. Although not shown in (a) of FIG. 7, the transaction proposal (eTP) B→G includes information of B and G that corresponds to key information.

(b) of FIG. 7 and (c) of FIG. 7 correspond to (b) of FIG. 6 and (c) of FIG. 6, respectively. Since the key information of the transaction proposal (eTP): B→G received from the transaction packer 110 corresponds to B and G, there is no change in the first common keyset information and the first common transaction batch information.

In contrast, (d) of FIG. 7 illustrates that second common keyset information B, F, and G is newly generated for the transaction proposal (eTP): B→G using the key information 13 and G included in the transaction proposal (eTP). The second common keyset information represents a set of key information common to transaction proposals (eTP): B→F and B→G, corresponding to B, F, and G. Additionally, (e) of FIG. 7 illustrates that second common transaction batch information B→F and B→G corresponding to the second common keyset information B, F, and G. Referring to (d) and (e) of FIG. 7, it can be confirmed that the second common keyset information B, F and G and the second common transaction batch information B→F and B→G corresponding to the respective transaction proposals (eTP): B→F and B→G are each generated by the transaction aggregator 120.

Figure 8:
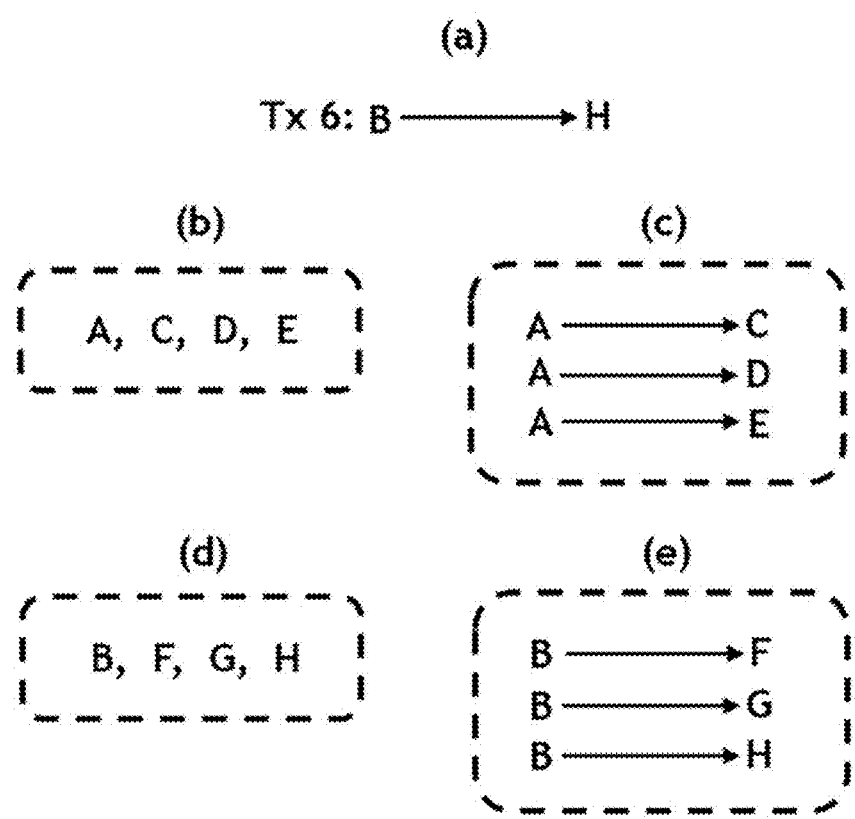
FIG. 8 is a reference diagram illustrating another example for describing a process by which the transaction aggregator generates common keyset information and common transaction batch information.

FIG. 8 is a reference diagram of another example for describing a process of generating common keyset information and common transaction batch information performed by the transaction aggregator 120.

(a) of FIG. 8 represents a transaction proposal (eTP): B→H received from the transaction packer 110. Although not shown in (a) of FIG. 8, the transaction proposal (eTP) B→H includes information of B and H that corresponds to key information.

(b) of FIG. 8 and (c) of FIG. 8 correspond to (b) of FIG. 7 and (c) of FIG. 7, respectively. Since the key information of the transaction proposal (eTP): B→H received from the transaction packer 110 corresponds to B and H, there is no change in the first common keyset information and the first common transaction batch information.

In contrast, (d) of FIG. 8 illustrates that second common keyset information B, F, G, and H is newly generated for the transaction proposal (eTP): B→H using the key information B and H included in the transaction proposal (eTP). The second common keyset information represents a set of key information common to transaction proposals (eTP): B→F, B→G, and B→H, corresponding to B, F, G, and H. Additionally, (e) of FIG. 8 illustrates that second common transaction batch information B→F, B→G, and B→H corresponding to the second common keyset information B, F, G, and H. Referring to (d) and (e) of FIG. 8, it can be confirmed that the second common keyset information B, F, G and H and the second common transaction batch information B→F, B→G, and B→H corresponding to the respective transaction proposals (eTP): B→F, B→G, and B→H are each generated by the transaction aggregator 120.

Figure 9:
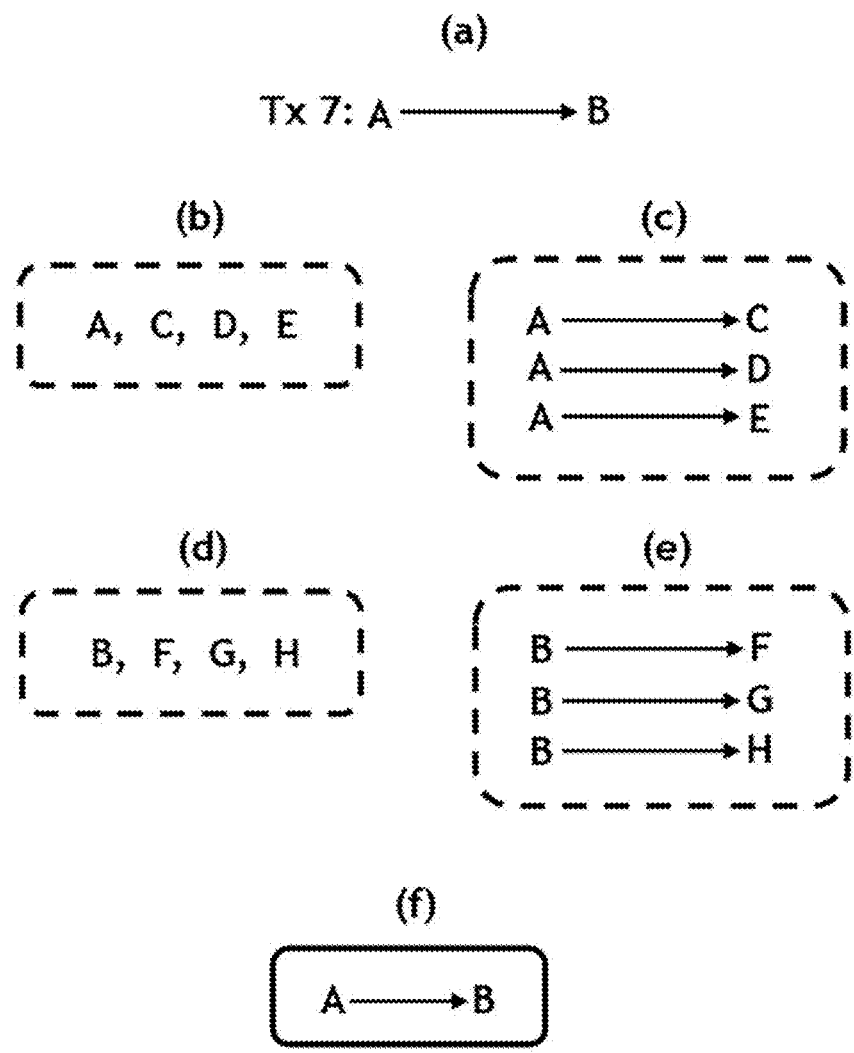
FIG. 9 is a reference diagram illustrating another example for describing a process by which the transaction aggregator generates common keyset information and common transaction batch information.

FIG. 9 is a reference diagram of another example for describing a process of generating common keyset information and common transaction batch information performed by the transaction aggregator 120.

(a) of FIG. 9 represents a transaction proposal (eTP): A→B received from the transaction packer 110. Although not shown in (a) of FIG. 9, the transaction proposal (eTP) A→B includes information of A and B that corresponds to key information.

The key information A and 13 included in the transaction proposal (eTP): A→B is included in the first common keyset information A, C, D, and E and the second common keyset information B, F, G, and H, respectively. Therefore, the transaction proposal (eTP): A→B cannot be classified to be included in the first common keyset information A, C, D, and E and the corresponding first common transaction batch information A→C, A→D, and A→E, nor can it be classified to be included in the second common keyset information B, F, G, and H and the corresponding second common transaction batch information B→F, B→G, and B→H.

Accordingly, when the key information intersects with a plurality of pieces of common keyset information, the transaction aggregator 120 does not generate common keyset information and common transaction batch information for the transaction proposal (eTP) containing the corresponding key information. Instead, it stores the key information in a separate temporary storage space to be processed at the time of blockchain execution in the next cycle.

As a result, (b) of FIG. 9, (c) of FIG. 9, (d) of FIG. 9, and (e) of FIG. 9 correspond to (b) of FIG. 8, (c) of FIG. 8, (d) of FIG. 8, and (e) of FIG. 8, respectively, with no changes in the first and second common keyset information and the first and second common transaction batch information. In addition, (f) of FIG. 9 shows the state of the transaction proposal (eTP): A→B temporarily stored in a separate storage space to be executed in the next blockchain processing cycle.

Figure 10:
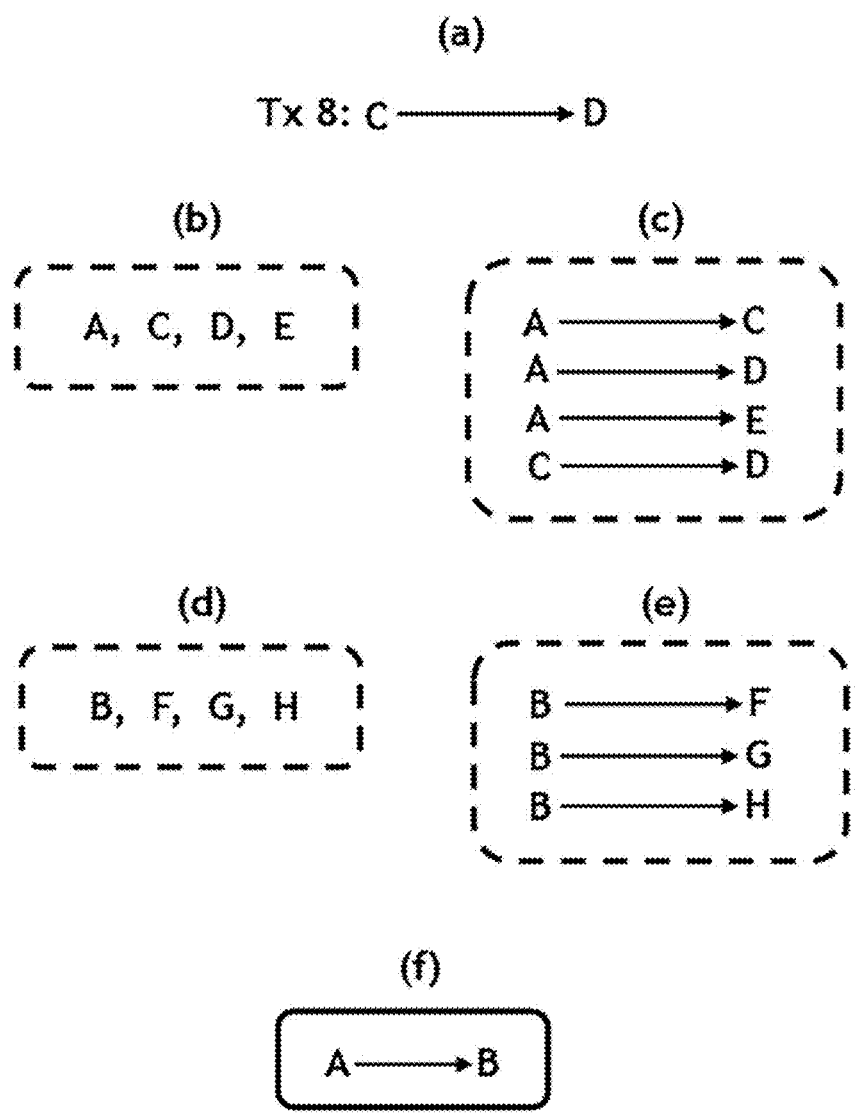
FIG. 10 is a reference diagram illustrating another example for describing a process by which the transaction aggregator generates common keyset information and common transaction batch information.

FIG. 10 is a reference diagram of another example for describing a process of generating common keyset information and common transaction batch information performed by the transaction aggregator 120.

(a) of FIG. 10 represents a transaction proposal (eTP): C→D received from the transaction packer 110. Although not shown in (a) of FIG. 10, the transaction proposal (eTP) C→D includes information of C and D that corresponds to key information.

(b) of FIG. 10 corresponds to (b) of FIG. 9. Since the key information of the transaction proposal (eTP): C→D received from the transaction packer 110 corresponds to C and D, there is no change in the first common keyset information. However, (c) of FIG. 10 shows the first common transaction batch information, which is the common transaction batch information with the transaction proposal (eTP) C→D added thereto, including A→C, A→D, A→E, and C→D.

(d) of FIG. 10 and (e) of FIG. 10 correspond to (d) of FIG. 9 and (e) of FIG. 9, respectively. Since the key information of the transaction proposal (eTP): C→D received from the transaction packer 110 corresponds to C and D, there is no change in the second common keyset information and the second common transaction batch information. Moreover, (f) of FIG. 10 corresponds to the temporarily stored transaction proposal (eTP): A→B to be executed next, and thus, there is no change.

Figure 11:
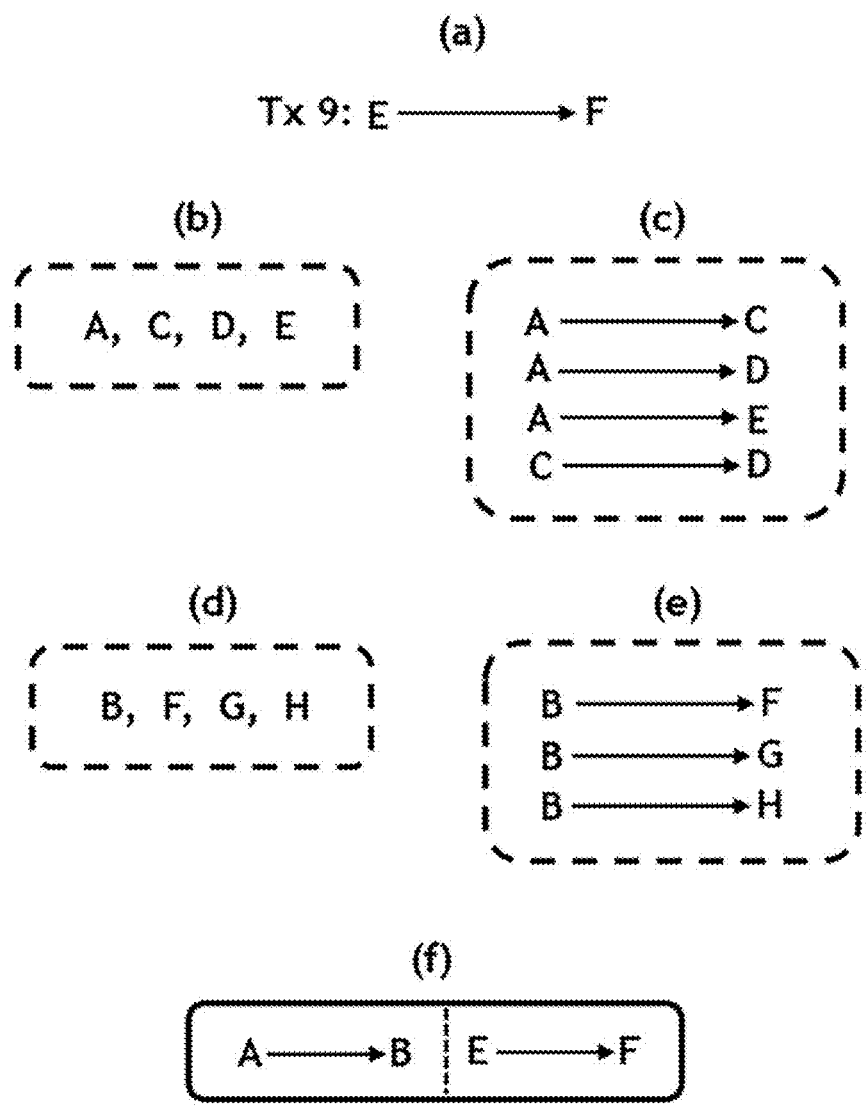
FIG. 11 is a reference diagram illustrating another example for describing a process by which the transaction aggregator generates common keyset information and common transaction batch information.

FIG. 11 is a reference diagram of another example for describing a process of generating common keyset information and common transaction batch information performed by the transaction aggregator 120.

(a) of FIG. 11 represents a transaction proposal (eTP): E→F received from the transaction packer 110. Although not shown in (a) of FIG. 11, the transaction proposal (eTP) E→F includes information of E and F that corresponds to key information.

The key information E and F included in the transaction proposal (eTP): E→F is included in the first common keyset information A, C, D, and E and the second common keyset information B, F, G, and H, respectively. Therefore, the transaction proposal (eTP): E→F cannot be classified to be included in the first common keyset information A, C, D, and E and the corresponding first common transaction batch information A→C, A→D, A→E, and C→D, nor can it be classified to be included in the second common keyset information B, F, G, and H and the corresponding second common transaction batch information B→F, B→G, and B→H.

Accordingly, when the key information intersects with a plurality of pieces of common keyset information, the transaction aggregator 120 does not generate common keyset information and common transaction batch information for the transaction proposal (eTP) containing the corresponding key information. Instead, it stores the key information in a separate temporary storage space to be processed at the time of blockchain execution in the next cycle.

As a result, (b) of FIG. 11, (c) of FIG. 11, (d) of FIG. 11, and (e) of FIG. 11 correspond to (b) of FIG. 10, (c) of FIG. 10, (d) of FIG. 10, and (e) of FIG. 10, respectively, with no changes in the first and second common keyset information and the first and second common transaction batch information.

In addition, (f) of FIG. 11 shows the state of the transaction proposal (eTP): E→F temporarily stored in a separate storage space to be executed in the next blockchain processing cycle. Accordingly, it can be confirmed that the transaction proposal (eTP): E→F is stored in addition to the previously stored transaction proposal (eTP): A→B.

Figure 12:
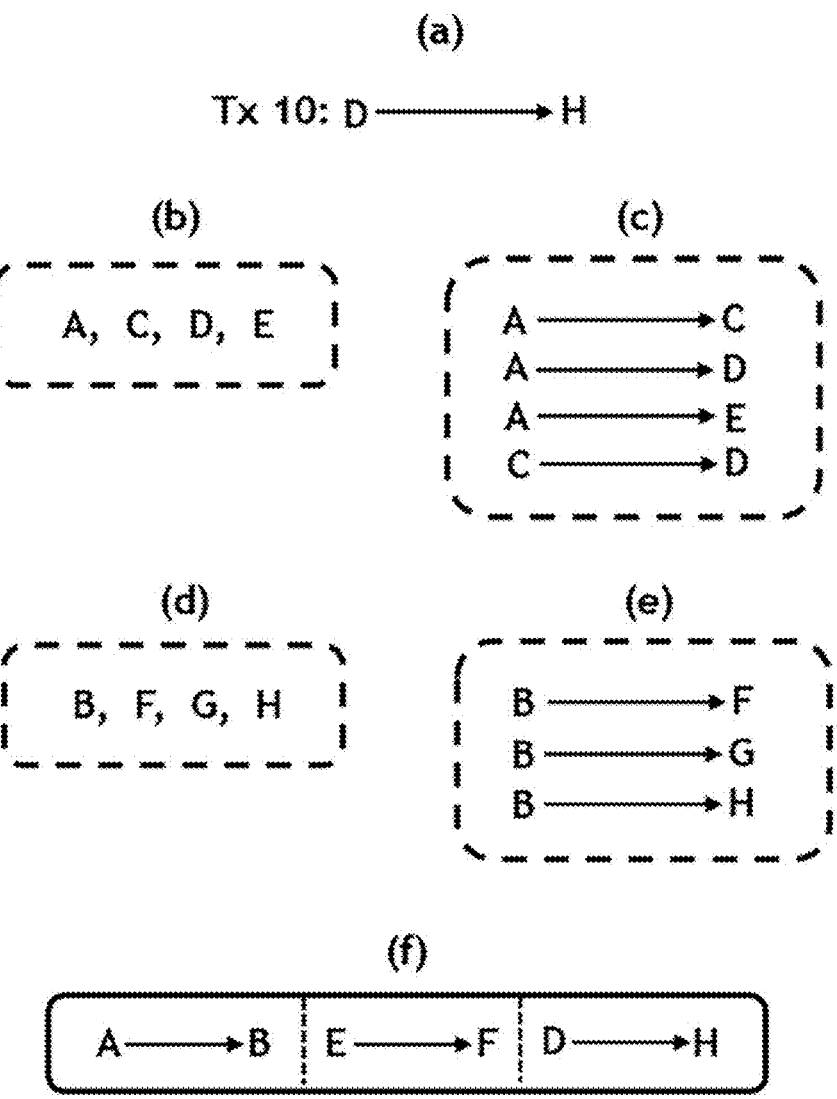
FIG. 12 is a reference diagram illustrating another example for describing a process by which the transaction aggregator generates common keyset information and common transaction batch information.

FIG. 12 is a reference diagram of another example for describing a process of generating common keyset information and common transaction batch information performed by the transaction aggregator 120.

(a) of FIG. 12 represents a transaction proposal (eTP): D→H received from the transaction packer 110. Although not shown in (a) of FIG. 12, the transaction proposal (eTP) D→H includes information of D and H that corresponds to key information.

The key information D and H included in the transaction proposal (eTP): D→H is included in the first common keyset information A, C, D, and E and the second common keyset information B, F, G, and H, respectively. Therefore, the transaction proposal (eTP): D→F cannot be classified to be included in the first common keyset information A, C, D. and E and the corresponding first common transaction batch information A→C, A→D, A→E, and C→D, nor can it be classified to be included in the second common keyset information B, F, G, and H and the corresponding second common transaction batch information B→F, B→G, and B→H.

Accordingly, when the key information intersects with a plurality of pieces of common keyset information, the transaction aggregator 120 does not generate common keyset information and common transaction batch information for the transaction proposal (eTP) containing the corresponding key information. Instead, it stores the key information in a separate temporary storage space to be processed at the time of blockchain execution in the next cycle.

As a result, (b) of FIG. 12, (c) of FIG. 12, (d) of FIG. 12, and (e) of FIG. 12 correspond to (b) of FIG. 11, (c) of FIG. 11, (d) of FIG. 11, and (e) of FIG. 11, respectively, with no changes in the first and second common keyset information and the first and second common transaction batch information.

In addition, (f) of FIG. 12 shows the state of the transaction proposal (eTP): D→H temporarily stored in a separate storage space to be executed in the next blockchain processing cycle. Accordingly, it can be confirmed that the transaction proposal (eTP): D→H is stored in addition to the previously stored transaction proposals (eTP): A→B and E→F.

Figure 13:
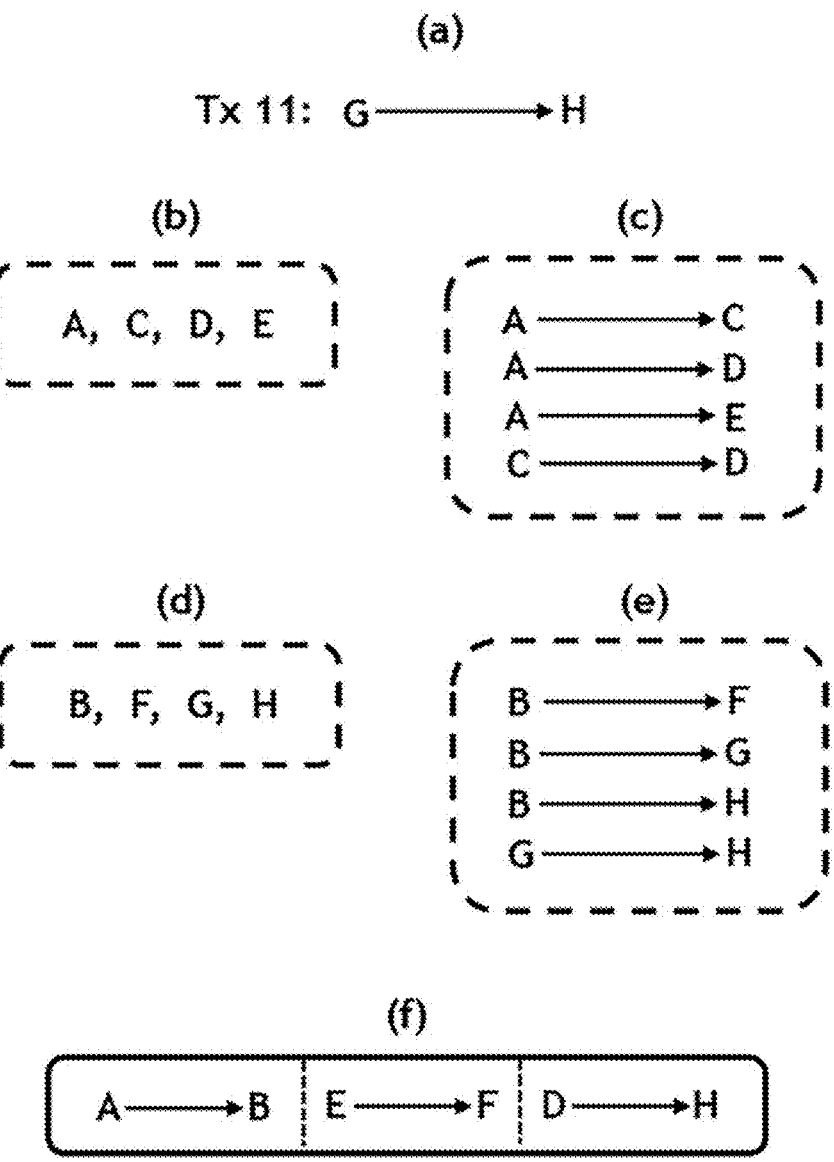
FIG. 13 is a reference diagram illustrating another example for describing a process by which the transaction aggregator generates common keyset information and common transaction batch information.

FIG. 13 is a reference diagram of another example for describing a process of generating common keyset information and common transaction batch information performed by the transaction aggregator 120.

(a) of FIG. 13 represents a transaction proposal (eTP): G→H received from the transaction packer 110. Although not shown in (a) of FIG. 13, the transaction proposal (eTP) G→H includes information of G and H that corresponds to key information.

(b) of FIG. 13 and (c) of FIG. 13 correspond to (b) of FIG. 12 and (c) of FIG. 12, respectively. Since the key information of the transaction proposal (eTP): G→H received from the transaction packer 110 corresponds to G and H, there is no change in the first common keyset information and the first common transaction batch information.

In addition, (d) of FIG. 13 corresponds to (d) of FIG. 12. Since the key information of the transaction proposal (eTP): G→H received from the transaction packer 110 corresponds to C and H, there is no change in the second common keyset information. However, (e) of FIG. 13 shows the second common transaction batch information, which is the common transaction batch information with the transaction proposal (eTP) G→H added thereto, including A→C, A→D, A→E, and G→H. Moreover, (f) of FIG. 13 corresponds to the temporarily stored transaction proposals (eTP): A→B, E→F, and D→H to be executed next, and thus, there is no change.

The transaction aggregator 120 designates the execution node group 130 for the calculation of the common transaction batch information upon receiving processing capacity information from each of a plurality of execution nodes and transmits the common keyset information and the common transaction batch information to the designated execution node group 130. The transaction aggregator 120 may receive the processing capacity information from the plurality of execution nodes at the time of generating the common keyset information and the common transaction batch information and designate the execution node group 130 accordingly.

The execution node group 130 includes at least one execution node for the simulation of at least one transaction. There may be a plurality of execution node groups 130. Each execution node belonging to the execution node group 130 is called a transaction executor.

As shown in FIG. 1, the execution node group 130 includes a plurality of transaction executors 130-1, 130-2, 130-3, . . . . Each of the transaction executors 130-1, 130-2, 130-3, . . . sequentially executes simulations regarding the transaction proposals included in the transaction batch information transmitted by the transaction aggregator 120. In addition, each of the transaction executors 130-1, 130-2, 130-3, . . . transfers the common keyset information received from the transaction aggregator 120 to the ledger manager 140.

Meanwhile, each of the transaction executors 130-1, 130-2, 130-3, . . . may execute a simulation in parallel with other transaction executors belonging to another execution node group.

Each of the transaction executors 130-1, 130-2, 130-3, . . . is equipped with at least one cache memory. Here, the cache memory may include the aforementioned global cache and local cached R/W set. In this case, the global cache may be referred to as global cache memory, and the local cached R/W set may be referred to as local cache memory.

The global cache memory is a memory that temporarily stores the Read/Write values of all transactions executed within a single block generation cycle. Additionally, the local cache memory is a memory that temporarily stores the Read/Write values during the execution of a single transaction.

Figure 14:
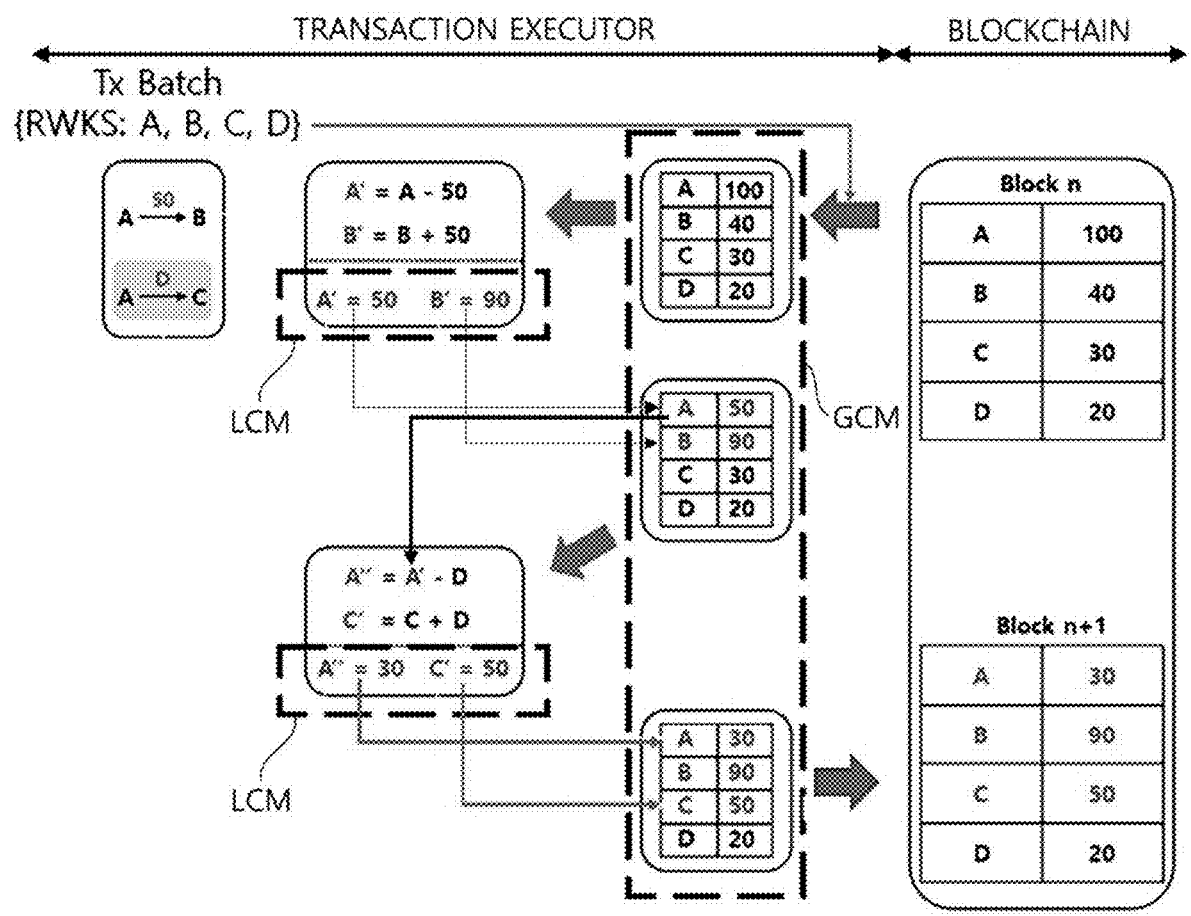
FIG. 14 is a reference diagram illustrating an example for describing a process by which a transaction executor executes a simulation regarding each transaction proposal.

FIG. 14 is a reference diagram illustrating an example for describing a process in which the transaction executor executes a simulation regarding each of the transaction proposals using the common transaction batch information.

Referring to FIG. 14, the transaction executor is illustrated as including a global cache memory (GCM) and a local cache memory (LCM).

Each of the transaction executors 130-1, 130-2, 130-3, . . . stores state information resulting from the simulation of transaction proposals in the GCM and the LCM, and uses the stored state information as the value for the simulation of the next transaction proposal.

For the simulation of a transaction proposal, each of the transaction executors 130-1, 130-2, 130-3, . . . first accesses the cache memory to reference the state information, and if the state information for the simulation of the transaction proposal does not exist in the cache memory, it accesses the ledger information stored in the blockchain and stores transaction information of the ledger information in the cache memory.

Referring to FIG. 14, the simulation execution process for each of the transaction executors 130-1, 130-2, 130-3, . . . will be described.

For example, each of the transaction executors 130-1, 130-2, 130-3 . . . receives arbitrary common transaction batch information from the transaction aggregator 120. In this case, the common transaction batch information, as shown in FIG. 14, includes transaction proposals A→B and A→C having key information corresponding to {A, B, C, D}. The transaction proposal A→B is a request signal to deduct an amount equivalent to 50 from account A and deposit the deducted amount of 50 into account B. Additionally, the transaction proposal A→C is a request signal to deduct an amount corresponding to D from account A and deposit the deducted amount D into account C.

Each of the transaction executors 130-1, 130-2, 130-3, . . . sequentially executes simulations for the transaction proposals included in the received common transaction batch information.

Each of the transaction executors 130-1, 130-2, 130-3, . . . may receive key information and key value information necessary for the simulation from the ledger manager 140, which manages the blockchain ledger information, and store same in the GCM in advance. For example, as described with reference to FIG. 14, each of the transaction executors 130-1, 130-2, 130-3, . . . may retrieve the ledger information registered on the blockchain, such as key information A, B, C, and D and corresponding key value information 100, 40, 30, and 20, and store same in the GCM before the simulation.

In particular, for the simulation of the transaction proposal, each of the transaction executors 130-1, 130-2, 130-3, . . . first accesses the cache memory to reference the state information. When the state information for the simulation of the transaction proposal does not exist in the cache memory, they transfers the common keyset information to the ledger manager to obtain the necessary key information and key value information from the blockchain ledger for the simulation.

Accordingly, the ledger manager 140 receives the common keyset information from each of the transaction executors 130-1, 130-2, 130-3, . . . , retrieves the key value information corresponding to the common keyset information from the blockchain ledger information, and transfers it to each of the transaction executors 130-1, 130-2, 130-3, . . . .

When the ledge manager 140 retrieves key value information corresponding to the common keyset information from the ledger information, it retrieves the key value information corresponding to all key information included in the common keyset information from the ledger information at once.

Table 8 below is table information illustrating blockchain ledger information managed by the ledger manager 140.

TABLE 8

| Blockchain | Key information | Key value information |
|---|---|---|
| Block n | A | 10 |
| | C | 30 |
| | E | 50 |
| | G | 15 |
| Block n-1 | A | 30 |
| | B | 20 |
| | G | 80 |
| | E | 10 |
| Block n-2 | B | 20 |
| | C | 50 |
| | G | 100 |
| | E | 200 |
| Block n-3 | E | 30 |
| | A | 40 |
| | D | 40 |
| | F | 60 |
| . . . | . . . | . . . |

In Table 8, block n corresponds to the most recently connected block in the blockchain, followed sequentially by block n-1, block n-2, and block n-3, which are previously connected blocks. For example, if the ledger information stored in the ledger manager 140 corresponds to Table 8 and the ledger manager 140 has received common keyset information A, B, C, and D from any one of the transaction executors 130-1, 130-2, 130-3, . . . , the ledger manager 140 accesses the most recently connected block n in the ledger information to check if there is key value information corresponding to the common keyset information A, B, C, and D. According to Table 8, the ledger manager 140 retrieves the key information A and C and the corresponding key value information 10 and 30 from block n. Then, the ledger manager 140 accesses block n-1, the previous block of block n, to check if there is any key information B or D that has not yet been retrieved and corresponding key value information. Accordingly, the ledger manager 140 retrieves key information B and the corresponding key value information 20 from block n-1. At this point, as key information A and the corresponding key value information 30 stored in block n-1 correspond to information from a previous block compared to the latest block n, the ledger manager 140 does not retrieve the key value information for the key information A stored in block n-1.

Subsequently, the ledger manager 140 accesses block n-2, the previous block of block n-1, to check if there is key information D that has not yet been retrieved and corresponding key value information. At this time, as key information B and C and the corresponding key value information 20 and 50 stored in block n-2 correspond to information from a previous block compared to the latest block n and the block n-1, the ledger manager 140 does not retrieve the key value information for the key information B and C stored in block n-2.

Since there is no key value information for key information D in block n-2, the ledger manager 140 accesses block n-3, the previous block of block n-2, to check if there is key information D that has not yet been retrieved and corresponding key value information. Accordingly, the ledger manager 140 retrieves key information D and the corresponding key value information 40 from block n-3.

By retrieving the key value information corresponding to the key information D stored in block n-3, the ledger manager 140 may retrieve all key value information corresponding to the common keyset information A, B, C, and D requested by the transaction executor in a single access to the ledger information.

Afterwards, the ledger manager 140 transfers all the key value information corresponding to the common keyset information A, B, C, and D retrieved from the ledger information to the requesting transaction executor.

Once each of the transaction executors 130-1, 130-2, 130-3, . . . receives the key information and key value information corresponding to the common keyset information from the ledger manager 140, they store the received key information and key value information in the cache memory.

Subsequently, each of the transaction executors 130-1, 130-2, 130-3, . . . executes the simulation regarding the transaction proposal: A→B, which is ranked first. To this end, each of the transaction executors 130-1, 130-2, 130-3, . . . first retrieves key value information "100" corresponding to key information A and key value information "40" corresponding to key information 13 from the GCM as information for the simulation of the transaction proposal: A→B.

Each of the transaction executors 130-1, 130-2, 130-3, . . . uses the key information and corresponding key value information retrieved from the GCM to execute the simulation of the transaction proposal: A→B, and stores the resulting state information A'=50 and B'=90 in the LCM. Subsequently, each of the transaction executors 130-1, 130-2, 130-3, . . . references the state information A'=50 and B'=90 stored in the LCM to update the key information and key value information in the GCM.

Afterwards, each of the transaction executors 130-1, 130-2, 130-3, . . . executes the simulation for the transaction proposal: A→C, which is ranked second among the transaction proposals included in the common transaction batch information. To this end, each of the transaction executors 130-1, 130-2, 130-3, . . . first retrieves key value information "50" corresponding to key information A and key value information "30" corresponding to key information C from the GCM as information for the simulation of the transaction proposal: A→C. Meanwhile, if the key information D and the corresponding key value information "20" are not stored in the GCM as information for the simulation of the transaction proposal: A→C, each of the transaction executors 130-1, 130-2, 130-3, . . . accesses the blockchain to retrieve the key information D and the corresponding key value information 20 included in the ledger information, stores the read information in the GCM, and then uses the stored information to execute the simulation corresponding to the transaction proposal.

Each of the transaction executors 130-1, 130-2, 130-3, . . . uses the key information and corresponding key value information retrieved from the GCM to execute the simulation of the transaction proposal: A→C, and stores the resulting state information A"=30 and C'=50 in the LCM. Subsequently, each of the transaction executors 130-1, 130-2, 130-3, . . . references the state information A"=30 and C'=50 stored in the LCM to update the key information and key value information in the GCM.

After that, since each of the transaction executors 130-1, 130-2, 130-3, . . . has completed the simulation execution for all transaction proposals included in the common transaction batch information, they transfer the key information and key value information in the GCM, which are state information resulting from the simulation, to the blockchain to add them to the corresponding blockchain ledger information.

Subsequently, each of the transaction executors 130-1, 130-2, 130-3, . . . transfers response information indicating that the simulation execution for all transaction proposals included in the common transaction batch information has been completed to a committing peer (not shown), which records the ledger information.

Figure 15:
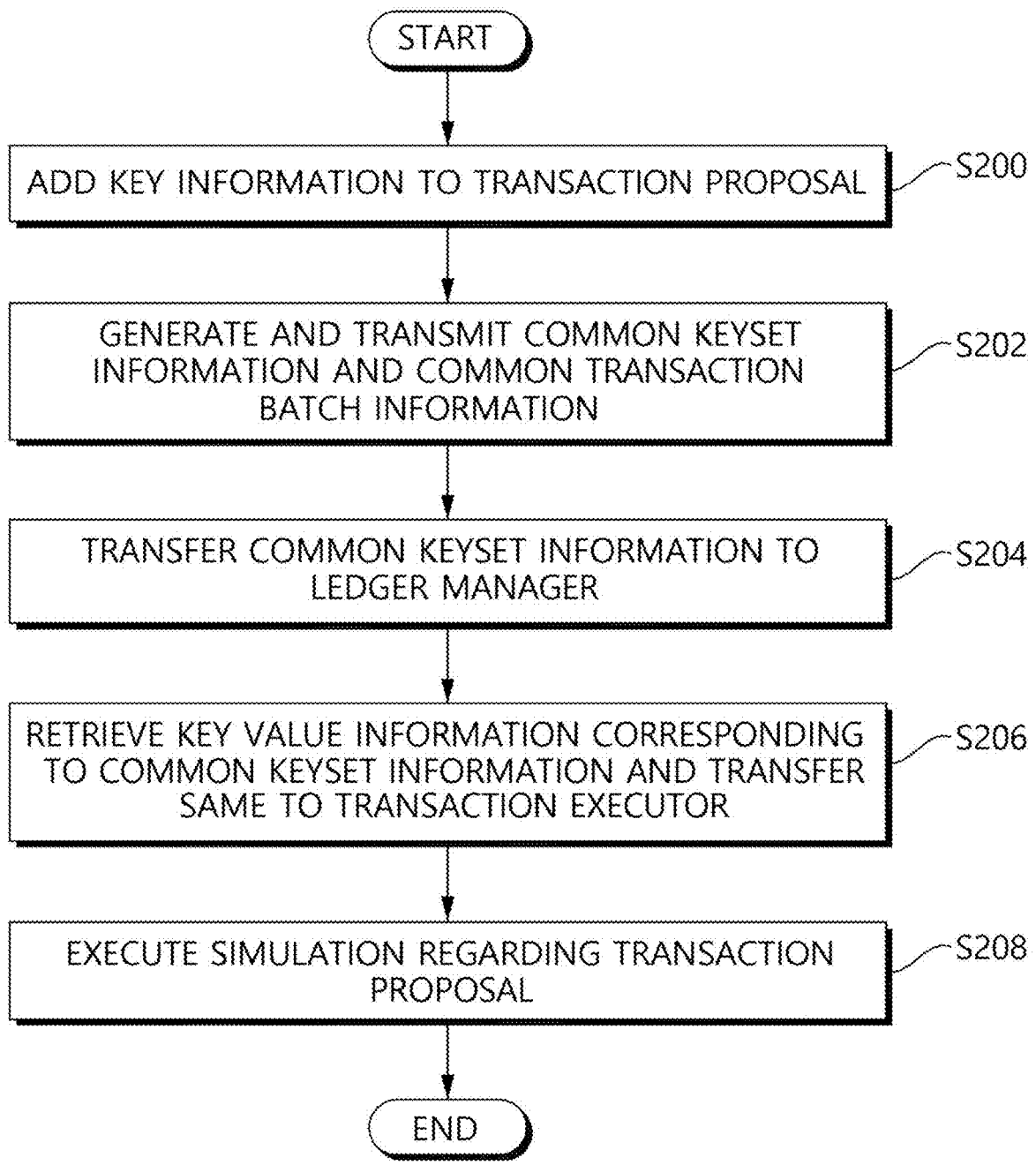
FIG. 15 is a flowchart illustrating an embodiment of a method of accessing ledger information by using common keyset information according to the present invention.

FIG. 15 is a flowchart illustrating an embodiment of a method of accessing ledger information by using common keyset information according to the present invention.

A transaction packer generates a transaction proposal (Tx Proposal) representing the transaction information according to the user's transaction request and adds key information corresponding to the transaction request to the generated transaction proposal (step S200). The transaction proposal includes transaction information corresponding to the user's transaction request and represents the data format of a transaction that can be used by the transaction aggregator 120.

The key information refers to the ledger key as defined in the terminology above. Additionally, the key information may include partial key information in an indetermined form including an array or composite key. This refers to the partial ledger key as defined in the terminology above.

The transaction packer converts the user's transaction request into a Tx proposal, adds additional information to generate an eTP, and transfers the generated eTP to the transaction aggregator. Here, the eTP is a Tx proposal with additional information (R/W key set description information) added to the existing Tx Proposal for delivery to the transaction aggregator 120.

After step S200, common keyset information and common transaction batch information corresponding to the transaction proposal are generated based on the key information included in the transaction proposal received from the transaction packer, and then the common keyset information and the common transaction batch information are transmitted to an execution node group distinguished and predesignated with regard to the common transaction batch information (step S202).

The common keyset information represents a set of keys that have the same key among the pieces of key information included in a plurality of transaction proposals. Here, the common keyset information refers to R/W Key Set (RWKS) information as defined in the terminology above.

The transaction batch information represents a set of transaction proposals respectively corresponding to pieces of key information included in the common keyset information. Here, the transaction batch information refers to the eTPB as defined in the terminology above, and the order within the eTPB is defined by eTPID (TxID).

The transaction aggregator designates the execution node group for the calculation of the common transaction batch information upon receiving processing capacity information from each of a plurality of execution nodes, and transmits the common keyset information and the common transaction batch information to the designated execution node group. The transaction aggregator may receive the processing capacity information from the plurality of execution nodes at the time of generating the common keyset information and the common transaction batch information and designate the execution node group accordingly.

Each of the execution nodes transmits the simulation results to the transaction aggregator. Each of the execution nodes references the information stored in the transaction proposal (information in the receptor field of the transaction proposal) to transmit a Tx proposal response to the corresponding transaction aggregator.

After step S202, at least one transaction executor belonging to the execution node group transfers the common keyset information to the ledger manager (step S204).

Each of the transaction executors may store the ledger information stored in the blockchain in the cache memory in advance before the simulation of the transaction proposal. To this end, each of the transaction executors is equipped with at least one cache memory. Here, the cache memory may include a global cache memory and a local cache memory.

Each of the transaction executors stores the state information resulting from the simulation of the transaction proposals in the global cache memory and the local cache memory and uses the stored state information as a value for the simulation of the next transaction proposal.

For the simulation of the transaction proposal, each of the transaction executors first accesses the cache memory to reference the state information. When the state information for the simulation of the transaction proposal does not exist in the cache memory, they transfer the common keyset information to the ledger manager to obtain the necessary key information and key value information from the blockchain ledger for the simulation.

After step S204, the ledger manager receives the common keyset information from the transaction executor, retrieves key value information corresponding to the common keyset information from the blockchain ledger information, and transfers it to the transaction executor (step S206). The ledger manager receives the common keyset information from each of the transaction executors, retrieves the key value information corresponding to the common keyset information from the blockchain ledger information, and transfers it to each of the transaction executors.

When the ledge manager retrieves key value information corresponding to the common keyset information from the ledger information, it retrieves the key value information corresponding to all key information included in the common keyset information from the ledger information at once. The ledger manager transfers all the key value information corresponding to the common keyset information retrieved from the ledger information to the requesting transaction executor.

After step S206, the transaction executor executes the simulation regarding the transaction proposals using the received key value information (step S208).

Once each of the transaction executors receives the key information and key value information corresponding to the common keyset information from the ledger manager, they store the received information in the cache memory as state information resulting from the simulation of the transaction proposals. Accordingly, each of the transaction executors may utilize the stored state information as a value for the simulation of the next transaction proposal.

The exemplary embodiments of the present invention have been described above. Those skilled in the art will appreciate that various modifications are possible without departing from the essential characteristic of the present invention. Accordingly, the disclosed exemplary embodiments need to be considered in an illustrative aspect, not a limiting aspect. Therefore, it shall be construed in such a manner that the scope of the present invention is not limited to the aforementioned exemplary embodiment, and includes the contents described in the accompanying claims and various implementations within the scope equivalent to the claims.

The invention claimed is:

1. A system for accessing ledger information by using common keyset information, comprising:
    a transaction packer that generates a transaction (Tx) proposal indicating transaction information according to a user's transaction request and adds key information corresponding to the transaction request to the generated transaction proposal;
    a transaction aggregator that generates common transaction batch information and common keyset information corresponding to the transaction proposal according to the key information included in the transaction proposal received from the transaction packer, and transmits the common transaction batch information and the common keyset information to each execution node group distinguished and predesignated with regard to the common transaction batch information;
    at least one transaction executor that executes a simulation regarding the transaction proposals included in the common transaction batch information transmitted from the transaction aggregator, which belongs to the execution node group, and transfers the common keyset information; and
    a ledger manager that receives the common keyset information from the transaction executor, retrieves key value information corresponding to the common keyset information from blockchain ledger information and transfers same to the transaction executor,
    wherein the key information includes partial key information in an indetermined form including an array or composite key.

2. The system of claim 1, wherein the common transaction batch information represents a set of transaction proposals respectively corresponding to pieces of key information included in the common keyset information.

3. The system of claim 1, wherein the ledger manager is configured to retrieve key value information corresponding to all key information included in the common keyset information from the ledger information at once when retrieving key value information corresponding to the common keyset information from the ledger information.

4. The system of claim 1, wherein the transaction executor is configured to store state information resulting from simulation execution of the transaction proposals in a cache memory and use the stored state information as a value for simulation of the next transaction proposal.

5. The system of claim 4, wherein the transaction executor is configured to, for the simulation of the transaction proposal, first access the cache memory to reference the state information, and when the state information for the simulation of the transaction proposal does not exist in the cache memory, the transaction executor is configured to transfer the common keyset information to the ledger manager, receive key value information corresponding to the common keyset information from the ledger manager and store same in the cache memory.

6. A system for accessing ledger information by using common keyset information comprising:
    a transaction packer that generates a transaction (Tx) proposal indicating transaction information according to a user's transaction request and adds key information corresponding to the transaction request to the generated transaction proposal;
    a transaction aggregator that generates common transaction batch information and common keyset information corresponding to the transaction proposal according to the key information included in the transaction proposal received from the transaction packer, and transmits the common transaction batch information and the common keyset information to each execution node group distinguished and predesignated with regard to the common transaction batch information;
    at least one transaction executor that executes a simulation regarding the transaction proposals included in the common transaction batch information transmitted from the transaction aggregator, which belongs to the execution node group, and transfers the common keyset information; and
    a ledger manager that receives the common keyset information from the transaction executor, retrieves key value information corresponding to the common keyset information from blockchain ledger information and transfers same to the transaction executor,
    wherein the common keyset information may represent a keyset for keys that are identical among pieces of key information included in a plurality of transaction proposals.

7. A method of accessing ledger information by using common keyset information, comprising the steps of:
    generating, at a transaction packer, a transaction (Tx) proposal indicating transaction information according to a user's transaction request and adding key information corresponding to the transaction request to the generated transaction proposal;
    generating, at a transaction aggregator, common transaction batch information and common keyset information corresponding to the transaction proposal according to the key information included in the transaction proposal received and transmitting the common transaction batch information and the common keyset information to each execution node group distinguished and predesignated with regard to the common transaction batch information;
    transferring, at least one transaction executor, the common keyset information to a ledge manager;
    receiving, at the ledge manager, the common keyset information from the transaction executor, retrieving key value information corresponding to the common keyset information from blockchain ledger information, and transferring same to the transaction executor; and
    executing a simulation regarding the transaction proposals by using the received key value information,
    wherein the key information includes partial key information in an indetermined form including an array or composite key.

8. The method of claim 7, wherein the common keyset information represents a keyset for keys that are identical among pieces of key information included in a plurality of transaction proposals.

9. The method of claim 7, wherein the common transaction batch information represents a set of transaction proposals respectively corresponding to pieces of key information included in the common keyset information.

10. The method of claim 7, wherein the retrieving of the key value information corresponding to the common keyset information from the ledger information comprises retrieving key value information corresponding to all key information included in the common keyset information from the ledger information at once.

11. The method of claim 7, wherein the executing of the simulation regarding the transaction proposals comprises storing state information according to the simulation of the transaction proposals in a cache memory and using the stored state information as a value for simulation of the next transaction proposal.

12. The method of claim 11, wherein the executing of the simulation regarding the transaction proposals may include accessing the cache memory to reference the state information for the simulation of the transaction proposal, and when the state information for the simulation of the transaction proposal does not exist in the cache memory, transferring the common keyset information to the ledge manager, receiving key value information corresponding to the common keyset information from the ledge manager, and storing same in the cache memory.

* * * * *